United States Patent [19]

Teranishi et al.

[11] 3,818,249

[45] June 18, 1974

[54] PULSE GENERATING CIRCUIT

[75] Inventors: Yuichi Teranishi; Yoshikazu Hatsukano, both of Tokyo, Japan

[73] Assignee: Hitachi, Ltd., Tokyo, Japan

[22] Filed: Dec. 29, 1972

[21] Appl. No.: 319,540

[30] Foreign Application Priority Data

Dec. 29, 1971 Japan .................................. 46-3478

[52] U.S. Cl. .................. 307/268, 307/265, 307/293, 328/59

[51] Int. Cl. .............................................. H03k 5/01

[58] Field of Search ........... 307/265, 266, 268, 293; 328/59, 61, 63

[56] References Cited

UNITED STATES PATENTS

| | | | |
|---|---|---|---|
| 2,958,788 | 11/1960 | Githens | 307/293 X |
| 3,105,939 | 10/1963 | Onno et al. | 328/146 X |
| 3,131,362 | 4/1964 | Dersch | 307/268 X |

*Primary Examiner*—John Zazworsky
*Attorney, Agent, or Firm*—Craig & Antonelli

[57] ABSTRACT

A pulse generating circuit includes time constant circuits, switching circuits, and means to apply the output signals of the time constant circuits to the switching circuits, whereby a pulse signal suitable as, for example, a clear signal is generated at a predetermined time after the closure of a power switch.

13 Claims, 9 Drawing Figures

FIG. 1
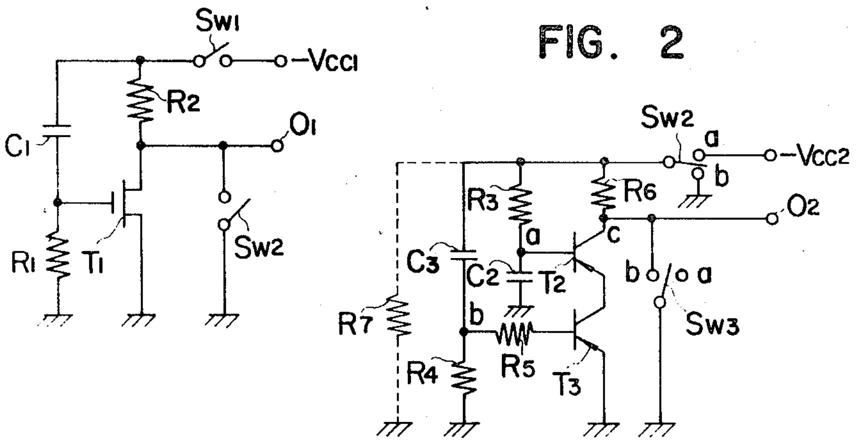
FIG. 3a FIG. 3b FIG. 3c
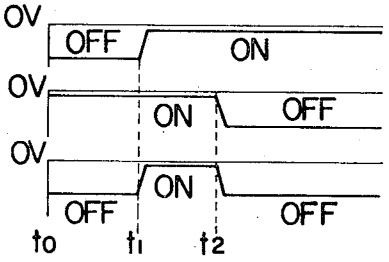
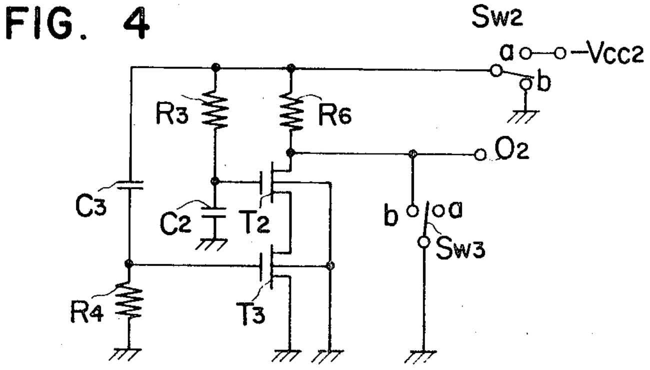

PULSE GENERATING CIRCUIT

BACKGROUND OF THE INVENTION

The present invention relates to a pulse generating circuit and, more particularly, to a pulse generating circuit which is applied to, for example, an automatic clear circuit of an electronic portable calculator.

DESCRIPTION OF THE PRIOR ART

FIG. 1 shows an example of a prior-art pulse generating circuit, which is especially applicable to an automatic clear circuit of an electronic portable calculator. Referring to the figure, $C_1$ designates a capacitor, $R_1$ and $R_2$ resistors, $T_1$ an MOS type field effect transistor, $Sw_1$ a power switch, $Sw_2$ a clearing switch, $O_1$ an output terminal for transmitting a clear signal, and $-Vcc_1$ a power source.

With such a construction, at the same time that the power switch $Sw_1$ is turned on the field effect transistor $T_1$ is brought into the "on" state, to clear the electronic portable calculator. When, thereafter, the voltage across the resistor $R_1$ becomes lower than the threshold voltage of the field effect transistor $T_1$, after a certain period of time, according to the time constant of the capacitor $C_1$ and the resistor $R_1$, the field effect transistor $T_1$ is brought into the "off" state. Thus, the automatic clearing function is effected.

SUMMARY OF THE INVENTION

An object of the present invention is to provide a pulse generating circuit by which a pulse signal, for example, one suitable as a clear signal, is generated at a predetermined time after a power switch has been turned-on.

Another object of the present invention is to provide a pulse generating circuit of simple construction.

Still another object of the present invention is to provide an inexpensive pulse generating circuit.

BRIEF DESCRIPTION OF THE DRAWINGS

FIG. 1 is a circuit diagram showing an example of a prior-art pulse generating circuit;

FIG. 2 is a circuit diagram showing an embodiment of a pulse generating circuit according to the present invention;

Figure 5:
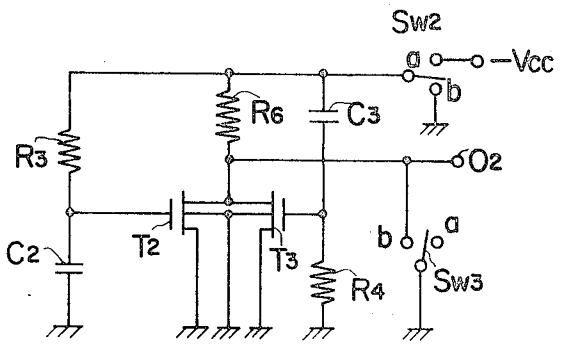
Figure 6:
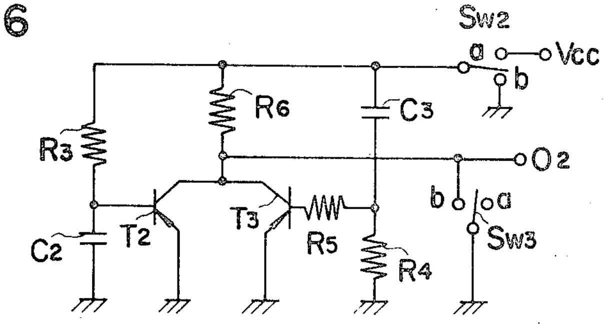
Figure 7:
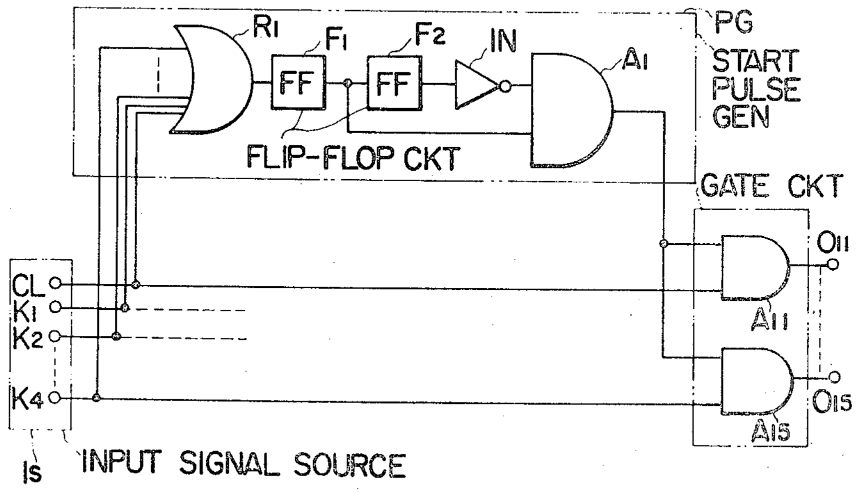

FIGS. *3a-3c* are diagrams for explaining the operation of the embodiment in FIG. 2;

FIGS. 4 to 6 are circuit diagrams showing different embodiments of the pulse generating circuit according to the present invention; and FIG. 7 is a block diagram showing a concrete example in which the pulse generating circuit of the present invention is applied to a gate circuit of an electronic portable calculator.

PREFERRED EMBODIMENTS OF THE INVENTION

Description will be made hereunder in conjunction with a few embodiments of the invention, reference being had to FIGS. 2 to 7. In the figures, the same parts or parts having the same functions are assigned with the same symbols.

FIG. 2 shows an embodiment of a pulse generating circuit according to the present invention. In the figure, $T_2$ and $T_3$ designate bipolar type transistors. The collector electrode of the transistor $T_2$ is connected through a resistor $R_6$ and a power switch $Sw_2$ to a power source $-Vcc_2$. The base electrode of the transistor $T_2$ is connected through a capacitor $C_2$ to ground, and through a resistor $R_3$ to the power switch $Sw_2$. The emitter electrode of the transistor $T_3$ is grounded, while the collector electrode of the transistor $T_3$ is connected to the emitter electrode of the transistor $T_2$. The base electrode of the transistor $T_3$ is grounded through resistors $R_5$ and $R_4$. The base electrode of the transistor $T_3$ is also connected through the resistor $R_5$ and a capacitor $C_3$ to the power switch $Sw_2$. $O_2$ indicates an output terminal which is connected to the collector electrode of the transistor $T_2$. $Sw_3$ is a switch, such as a clearing switch, which is arranged between the collector electrode of the transistor $T_2$ and ground. In this case, the respective values of the resistors $R_3$ and $R_4$ and the capacitors $C_2$ and $C_3$ are so set as to obtain the operation illustrated in FIGS. *3a-3c*.

At a time $t_0$, the power switch $Sw_2$ is thrown to the position of a contact *a*. A series connection consisting of the resistor $R_3$ and the capacitor $C_2$ constitutes an integrating circuit. The transistor $T_2$, immediately after the closure of the power switch, is in the "off" state since the terminal voltage of the capacitor $C_2$ does not instantly become greater than the base -emitter-ground threshold voltage of the transistor $T_2$. Similarly, the transistor $T_3$ is in the "on" state. A base current, which is limited to a safe value by the resistor $R_5$ flows through the capactior $C_3$.

After the time $t_0$ at which the power switch $Sw_2$ has been thrown to the position of the contact *a*, the capacitor $C_2$ is gradually charged. When, as a result, the terminal voltage of the capacitor $C_2$ exceeds the threshold voltage of the transistor $T_2$ at a time $t_1$ as illustrated in FIG. *3a*, the transistor $T_2$ is turned "on". The capacitor $C_3$ is charged through the resistor $R_4$ and the resistor $R_5$ as well as the transistor $T_3$, and its charging current decreases. The transistor $T_3$ is turned "off" at a time $t_2$ at which, as illustrated in FIG. *3b*, the base-emitter-ground voltage of the transistor $T_3$ becomes smaller than the threshold voltage due to the charging of the capacitor $C_3$. Accordingly, as illustrated in FIG. *3c*, both the transistors $T_2$ and $T_3$ are in the "on" state during the period of time from $t_1$ to $t_2$. Thus, an output suitable as, for example, a clear signal is obtained from the output terminal $O_2$. In this case, the times $t_1$ and $t_2$ can be controlled to arbitrary ones by appropriately setting the respective values of the resistor $R_3$, as well as the capacitor $C_2$, and the resistor $R_4$, as well as the capacitor $C_3$.

After the $t_2$ at which the signal output is provided from the output terminal $O_2$, the signal output can be arbitrarily transmitted by the use of the switch $Sw_3$.

In order to turn the power switch $Sw_2$ off, it may be changed-over to the position of a contact *b*, to thereby discharge the capacitors $C_2$ and $C_3$. A resistor $R_7$ may be connected between the power source and the ground, so as to discharge them through the resistance.

FIG. 4 shows another embodiment of the pulse generating circuit according to the present invention. A point of difference from the embodiment in FIG. 2 resides in the use of MOS type field effect transistors as $T_2$ and $T_3$. The input impedance of the field effect transistor is extremely high, so that the protective resistor $R_5$ as in the previous embodiment is not required.

FIG. 5 shows a further embodiment of the pulse generating circuit according to the present invention. The differences from the embodiment in FIG. 4 are that one output electrode of each of the MOS type field effect transistors $T_2$ and $T_3$ is grounded, and that the other output electrodes of the respective MOS type field effect transistors $T_2$ and $T_3$ are connected in common, the connection point being connected through the resistor $R_6$ and the power switch $Sw_2$ to a power source-Vcc. The output terminal $O_2$ is connected to the common connection point. The time constant of $C_2 \times R_3$ is made larger than that of $C_3 \times R_4$. A pulse obtained at the output terminal $O_2$ is equivalent to one resulting from the inversion of the pulse in any previous embodiment.

FIG. 6 shows a yet further embodiment of the pulse generating circuit according to the present invention. The difference from the embodiment in FIG. 5 resides in the use of bipolar transistors as $T_2$ and $T_3$.

The circuit operations of the embodiments in FIG. 4 to FIG. 6 are similar to that of FIG. 2. In the circuits in FIGS. 2 and 4, the "off" state of the two transistors have preference. In contrast, in the circuits in FIGS. 5 and 6, the "on" state of the two transistors have preference.

FIG. 7 shows a concrete example of a circuit in which the pulse generating circuit of the present invention is applied to a gate circuit of an electronic portable calculator. In the figure, CL designates a clear signal input terminal to which the terminal $O_2$ of the circuit of any embodiment discussed above is connected. $K_1, K_2, \ldots \ldots K_4$ indicate key input terminals. The input terminals CL and $K_1, K_2, \ldots \ldots K_4$ constitute an input signal source IS. $R_1$ represents an OR circuit, $F_1$ and $F_2$ flip-flop circuits, IN an inverter, and $A_1$ and AND circuit. These components $R_1$, $F_1$, $F_2$, IN and $A_1$ constitute a start pulse generator PG. $A_{11}$ to $A_{15}$ represents AND circuits, which constitute a gate circuit G. Shown at $O_{11}, \ldots \ldots O_{15}$ are output terminals to which outputs of the AND circuits $A_{11}, \ldots \ldots A_{15}$ are respectively supplied.

The flip-flop circuits $F_1$ and $F_2$ of the start pulse generating circuit PG are triggered by a word pulse of the calculator. With the trigger at this time, a signal having been in the flip-flop circuit $F_1$ is delivered to the flip-flop circuit $F_2$, and signals having been delivered to the input terminals CL and $K_1$ to $K_4$ are delivered to the flip-flop circuit $F_1$.

When the outputs of the flip-flop circuits $F_1$ and $F_2$ become "1" and "0", respectively, the start pulse generating circuit PG opens the gates $A_{11}$ to $A_{15}$ of the gate circuit G.

That is, the signal supplied to the input terminals CL and $K_1$ to $K_4$ are transferred to the output terminals $O_{11}$ to $O_{15}$ after they are adjusted in time and in period by the word pulses.

The auto-clear signal illustrated in FIG. 3 has the logical value of "0" from the closure of the power source till the time $t_1$, the period between them being enough to make the flip-flop circuits $F_1$ and $F_2$ operable and to make the values of the circuits $F_1$ and $F_2$ the logical values of "0" and "0" by means of the auto-clear signal. It has the logical value of "1" during the period from the time $t_1$ till the time $t_2$ at which at least 1 word pulse period of the calculator has elapsed. It has the logical value of "0" after the time $t_2$.

Accordingly, the flip-flop circuits $F_1$ and $F_2$ have the logical values changed from "0", "0" to "1", "0" during the period from the time $t_1$ to the lapse of 1 word pulse period. As a result, the gate $A_{11}$ is opened, to transfer the clear signal from the input terminal CL to the output terminal $O_{11}$. If the clear signal has the logical value of "1" consecutively, the flip-flop circuits $F_1$ and $F_2$ fall into the logical values of "1" and "1" in the next word period. The gate $A_{11}$ is, accordingly, closed. Similarly, when the auto-clear signal falls into the logical value of "0" after the time $t_2$, the circuits $F_1$ and $F_2$ fall into the logical values of "0" and "1" or "0" and "0". Therefore, the gate $A_{11}$ remains closed, and the clearing procedure of the calculator with the clear key $Sw_3$ is then made possible.

Although, in the foregoing embodiments, two sets of series circuits are employed which are connected in parallel between the power switch $Sw_2$ and ground so as to be opposite in the positions of the constituent elements to each other and each of which consists of the capacitor and the resistor, it is a matter of course that the present invention is not restricted thereto.

Although, in the embodiments, the transistors $T_2$ and $T_3$ are employed as the switching elements, it is a matter of course that the present invention is not restricted thereto. For example, silicon controlled rectifiers may be used.

In the embodiments, the power source — $Vcc_2$ or Vcc is used. However, it is a matter of course that the invention is not restricted thereto, but that the polarities of the power source may be reversed. In this case, it is required to change, e.g., the polarity of the transistors as may be needed. Concerning the signal output, the two cases are considered as stated previously.

Needless to say, the present invention is not restricted to the foregoing embodiments, but a variety of applications and modifications can be considered.

As described above, with the pulse generating circuit according to the present invention, such various advantages are brought forth that a pulse signal can be generated by a simple construction at a predetermined time after turning a power switch, and that the circuit arrangement is inexpensive.

What we claim:

1. A pulse generating circuit comprising:

first and second switching means each having first and second electrodes and a control electrode and having one of a conductive and a non-conductive state in response to an input connected to control electrode;

time constant circuit means connected to said control electrodes of said switching means responsive to the connection of a reference potential thereto, for making said first switching means sustain one of the conductive and non-conductive states until a first instant of time and fall into the other state after the first instant of time, and for making said second switching means sustain said other state until a second instant of time and fall into said one state after said second instant of time, said first instant of time occurring prior to said second instant of time;

an output terminal connected to the first electrode of one of said switching means; and substantially zero impedance means for connecting the first electrode of the other of said switching means with one of the first and second electrodes of said one switching means so as to supply said output terminal with a pulse signal determined by said other state of both of said switching means during the period of time between said first and second instants of time.

2. A pulse generating circuit according to claim 1, wherein said switching means are connected in series.

3. A pulse generating circuit according to claim 1, wherein said switching means are connected in parallel.

4. A pulse generating circuit comprising:

first means, responsive to the connection of a first reference potential thereto at a first instant of time, for generating a first constant output voltage level for a preselected period of time until a second instant of time;

second means, responsive to the connection of said first reference potential thereto at said first instant of time, for generating said first output voltage after a specified period of time has elapsed from said first instant of time prior to said second instant of time; and third means, responsive to the output voltage levels generated by said first and second means, for providing a signal at said first voltage level for the period of time during which both the outputs of said first and second means are at said first output voltage level.

5. A pulse generating circuit according to claim 4, wherein each of said first and second means comprises an electronic switching element, having an input electrode, a control electrode, and an output electrode and having a time constant network connected to the control electrode thereof and being switchably coupled to a source of said first reference potential, and wherein said third means is connected to the output electrode of one of said electronic switching elements, while one of the input and output electrodes of the other electronic switching element is connected to one of the input and output electrodes of said one electronic switching element.

6. A pulse generating circuit according to claim 5, wherein each of said time constant networks comprises a series connection of a resistor and a capacitor switchably connected between said source of first reference potential and a source of a second reference potential, the control electrodes of said electronic switching elements being connected respectively to the common connection of the resistor and capacitor of each network.

7. A pulse generating circuit according to claim 6, wherein one of said networks has the resistor thereof switchably connected to said source of first reference potential while the other of said networks has the capacitor thereof switchably connected to said source of first reference potential.

8. A pulse generating circuit according to claim 5, wherein said electronic switching elements have their input and output electrode connected in series.

9. A pulse generating circuit according to claim 5, wherein said electronic switching elements have their input and output electrodes connected in parallel.

10. A pulse generating circuit according to claim 7, wherein each of said electronic switching elements comprise a bipolar transistor, with the collector of at least one of said transistors connected to said third means.

11. A pulse generating circuit according to claim 7, wherein each of said electronic switching elements comprises a field effect transistor wherein the drain electrode of at least one of said transistors is connected to said third means.

12. A pulse generating circuit according to claim 5, further including a bias resistor switchably connected between said source of first reference potential and the output electrode of one of said electronic switching elements.

13. A pulse generating circuit according to claim 5, further including a power switch connected between a source of said first reference potential and each of said first and second means.

* * * * *